United States Patent
Parnell et al.

(10) Patent No.: US 8,795,570 B1
(45) Date of Patent: Aug. 5, 2014

(54) GOLF BALL COVER COMPOSITION

(75) Inventors: Shane Parnell, Carlsbad, CA (US); Carl A. Brown, Temecula, CA (US)

(73) Assignee: Callaway Golf Company, Carlsbad, CA (US)

( * ) Notice: Subject to any disclaimer, the term of this patent is extended or adjusted under 35 U.S.C. 154(b) by 468 days.

(21) Appl. No.: 12/795,427

(22) Filed: Jun. 7, 2010

Related U.S. Application Data (60) Provisional application No. 61/225,879, filed on Jul. 15, 2009.

(51) Int. Cl.
  *A63B 37/12* (2006.01)
  *A63B 37/00* (2006.01)
  *B29C 45/14* (2006.01)
  *B29C 35/04* (2006.01)
  *C08F 287/00* (2006.01)

(52) U.S. Cl.
  USPC ............ 264/279.1; 264/328.1; 264/340; 264/347; 525/288; 525/326.5; 525/383; 473/354; 473/365; 473/373; 473/376; 473/377; 473/378

(58) Field of Classification Search
  None
  See application file for complete search history.

(56) References Cited

U.S. PATENT DOCUMENTS

| | | | | |
|---|---|---|---|---|
| 4,412,042 A | * | 10/1983 | Matsuura et al. | 525/260 |
| 4,884,814 A | | 12/1989 | Sullivan | |
| 4,911,451 A | | 3/1990 | Sullivan et al. | |
| 5,120,791 A | | 6/1992 | Sullivan | |
| 5,948,865 A | * | 9/1999 | Shimazaki et al. | 525/193 |
| 5,981,658 A | * | 11/1999 | Rajagopalan et al. | 525/72 |
| 7,279,529 B2 | | 10/2007 | Hogge et al. | |
| 7,338,392 B2 | | 3/2008 | Simonds et al. | |
| 7,361,101 B2 | | 4/2008 | Kennedy, III et al. | |
| 7,419,443 B2 | | 9/2008 | Simonds et al. | |
| 7,468,007 B2 | | 12/2008 | Simonds et al. | |

OTHER PUBLICATIONS

Dow Automotive Systems data sheet for Infuse; May 7, 2010.*

* cited by examiner

*Primary Examiner* — David Buttner
(74) *Attorney, Agent, or Firm* — Michael A. Catania; Sonia Lari; Rebecca Hanovice (57) ABSTRACT

A durable, injection moldable, thermoplastic elastomer that has the favorable resilience, feel, spin, barrier, and UV stability performance attributes is disclosed herein. An OBC grafted with silane provides a good cover shear durability (cut/tear/abrasion resistance). This invention combines the benefits of OBCs and silane crosslinking technology to yield a golf ball cover with a desirable combination of properties.

9 Claims, 5 Drawing Sheets

Step 1: Grafting of Vinylsilanes onto OBC

1) Radical Formation

2) Grafting

FIG. 4

Step 2: Moisture Crosslinking of Silane Grafted OBC

3) Hydrolysis

4) Condensation

Silane Crosslinked OBC

*FIG. 5*

| Compound Composition |||||
|---|---|---|---|
| Base Resin Type | Base Resin Conc. (wt%) | Crosslinker Type | Crosslinker Conc. (wt%) |
| Engage 8450 | 100 | | |
| Engage 8450 | 90 | 1,3-PBO | 10 |
| Engage 8450 | 70 | 1,3-PBO | 30 |
| LDPE | 100 | | |
| LDPE | 70 | 1,3-PBO | 30 |
| LDPE | ~60 | 1,3-PBO | ~40 |
| MVT75AT3 | 100 | | |
| MVT75AT3 | 80 | 1,3-PBO | 20 |
| Engage 8003 | 100 | | |
| Engage 8003 | 90 | Stab.P | 10 |
| LDPE | 90 | Stab.P | 10 |
| Engage 8003 | 90 | Heloxy 68 | 10 |
| MVT75AT3 | 90 | Heloxy 68 | 10 |
| Gamer/Bite Cover w/o MB | 90 | MP Diol | 10 |
| Gamer/Bite Cover w/o MB | 90 | EDO | 10 |
| Gamer/Bite Cover w/o MB | 90 | HDO | 10 |
| Infuse D9100.05/D9530.05 | 99 | Silfin 13 | 1 |
| Gamer/Bite Cover w/o MB | 90 | Mondur M | 10 |
| MVT75AT3 | 90 | Mondur M | 10 |
| Septon QB191 | 90 | Mondur M | 10 |
| Septon QB191 | 100 | | |
| Septon QB191 | 99 | Silfin 13 | 1 |
| Infuse 9530.05 | 100 | | |
| Infuse 9530.05 | 99 | Silfin 13 | 1 |
| Infuse D9100.05 | 100 | | |
| Infuse D9100.05 | 99 | Silfin 13 | 1 |
| Gamer/Bite Cover w/o MB | 99 | Silfin 13 | 1 |

*FIG. 6*

GOLF BALL COVER COMPOSITION

CROSS REFERENCES TO RELATED APPLICATIONS

The Present Application claims priority to U.S. Provisional Patent Application No. 61/225,879, filed Jul. 15, 2009, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention relates to golf ball cover compositions. More specifically, the present invention relates to golf ball cover compositions composed of a silane crosslinked olefin block copolymer.

2. Description of the Related Art

Traditional golf ball covers have been comprised of balata or blends of balata with elastomeric or plastic materials. The traditional balata covers are relatively soft and flexible. Upon impact, the soft balata covers compress against the surface of the club producing high spin. Consequently, the soft and flexible balata covers provide an experienced golfer with the ability to apply a spin to control the ball in flight in order to produce a draw or a fade, or a backspin which causes the ball to "bite" or stop abruptly on contact with the green. Moreover, the soft balata covers produce a soft "feel" to the low handicap player. Such playability properties (workability, feel, etc.) are particularly important in short iron play with low swing speeds and are exploited significantly by relatively skilled players.

Despite all the benefits of balata, balata covered golf balls are easily cut and/or damaged if mis-hit. Golf balls produced with balata or balata-containing cover compositions therefore have a relatively short life span.

As a result of this negative property, balata and its synthetic substitutes, trans-polybutadiene and transpolyisoprene, have been essentially replaced as the cover materials of choice by other cover materials such as ionomeric resins and polyurethanes.

Ionomeric resins are polymers containing interchain ionic bonding. As a result of their toughness, durability and flight characteristics, various ionomeric resins sold by E.I. DuPont de Nemours & Company under the trademark SURLYN® and by the Exxon Corporation (see U.S. Pat. No. 4,911,451) under the trademarks ESCOR® and IOTEK®, have become widely utilized for the construction of golf ball covers over the traditional "balata" (transpolyisoprene, natural or synthetic) rubbers. As stated, the softer balata covers, although exhibiting enhanced playability properties, lack the durability (cut and abrasion resistance, fatigue endurance, etc.) properties required for repetitive play.

Ionomeric resins are generally ionic copolymers of an olefin, such as ethylene, and a metal salt of an unsaturated carboxylic acid, such as acrylic acid, methacrylic acid, or maleic acid. Metal ions, such as sodium or zinc, are used to neutralize some portion of the acidic groups in the copolymer resulting in a thermoplastic elastomer exhibiting enhanced properties, such as durability, for golf ball cover construction over balata. However, some of the advantages gained in increased durability have been offset to some degree by the decreases produced in playability. This is because although the ionomeric resins are very durable, they tend to be very hard when utilized for golf ball cover construction, and thus lack the degree of softness required to impart the spin necessary to control the ball in flight. Since the ionomeric resins are harder than balata, the ionomeric resin covers do not compress as much against the face of the club upon impact, thereby producing less spin. In addition, the harder and more durable ionomeric resins lack the "feel" characteristic associated with the softer balata related covers.

As a result, while there are many different commercial grades of ionomers available both from DuPont and Exxon, with a wide range of properties which vary according to the type and amount of metal cations, molecular weight, composition of the base resin (for example, relative content of ethylene and methacrylic and/or acrylic acid groups) and additive ingredients such as reinforcement agents, etc., a great deal of research continues in order to develop a golf ball cover composition exhibiting not only the improved impact resistance and carrying distance properties produced by the "hard" ionomeric resins, but also the playability (for example, "spin", "feel", etc.) characteristics previously associated with the "soft" balata covers, properties which are still desired by the more skilled golfer.

Furthermore, a number of different golf ball constructions, such as one-piece, two-piece (a solid resilient center or core with a molded cover), three-piece (a liquid or solid center, elastomeric winding about the center, and a molded cover), and multi-piece golf balls, have been developed to produce golf balls exhibiting enhanced playability and durability. The different types of materials utilized to formulate the cores, mantles, windings, covers, etc. of these balls dramatically alters the balls' overall characteristics. In addition, multi-layered covers containing one or more ionomer resins or other materials have also been formulated in an attempt to produce a golf ball having the overall distance, playability and durability characteristics desired.

For example, in various attempts to produce a durable, high spin golf ball, the golfing industry has blended the hard ionomer resins with a number of softer ionomeric resins and applied these blends to two-piece and three-piece golf balls. U.S. Pat. Nos. 4,884,814 and 5,120,791 are directed to cover compositions containing blends of hard and soft ionomeric resins. However, it has been found that golf ball covers formed from hard-soft ionomer blends tend to become scuffed more readily than covers made of hard ionomer alone. Consequently, it would be useful to develop a golf ball having a combination of softness and durability which is better than the softness-durability combination of a golf ball cover made from a hard-soft ionomer blend.

Additionally, thermoset and thermoplastic polyurethanes have recently become popular materials of choice for golf ball cover construction. However, these polyurethanes are difficult and time consuming to process. Moreover, the molding of relatively thin wall cover layer(s), i.e., cover layers 0.075 inch or less in cross-sectional thickness, is difficult to accomplish. This limits the desired performance achieved by thin wall cover molding, such as improved distance. Furthermore, golf balls produced utilizing these materials tend to be soft and readily susceptible to scuffing.

Solid golf ball covers are typically composed of ionomer or polyurethane materials. While ionomer covers can provide good durability and resilience, they also exhibit a "hard" feel and lower spin rates. Polyurethane covers can be made to exhibit good durability, "soft" feel, and high spin rates. However, they typically have inferior resilience, poor barrier properties to moisture, and poor UV stability. Therefore, there remains a need for a golf ball cover material that exhibits good durability, high resilience, "soft" feel, high spin rates, good moisture barrier properties, and good UV stability.

U.S. Pat. No. 7,279,529 describes the use of polyethylene and other metallocene based polyolefins paired with silane crosslinking technology to produce golf ball layers. However, the polyolefins disclosed in the Patent do not have ideal elastomeric properties and do not provide a durable, resilient golf ball cover in conjunction with desirable feel and spin.

Thus, there is a need for a durable golf ball cover composed of a new material.

BRIEF SUMMARY OF THE INVENTION

The present invention seeks to overcome the prior art problems with the use of a new class of olefinic thermoplastic elastomers called olefin block copolymers ("OBC"). The use of these ordered OBC materials with silane crosslinking technology produces golf ball cover materials with improved durability, resilience, feel, spin, barrier properties, and UV stability.

The major goal of this project is to provide a durable, injection moldable, thermoplastic elastomer that has the favorable resilience, feel, spin, barrier, and UV stability performance attributes noted above. An OBC (e.g. Dow's INFUSE ethylene-octene block copolymer) can provide these attributes except for durability. To achieve good cover shear durability (cut/tear/abrasion resistance), silane crosslinking is a must. This invention combines the benefits of OBCs and silane crosslinking technology to yield a golf ball cover with a desirable combination of properties.

It is an objective to utilize the combination of OBCs with silane crosslinking technology to produce polyolefin based golf ball covers with improved durability, resilience, feel and spin.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 4:
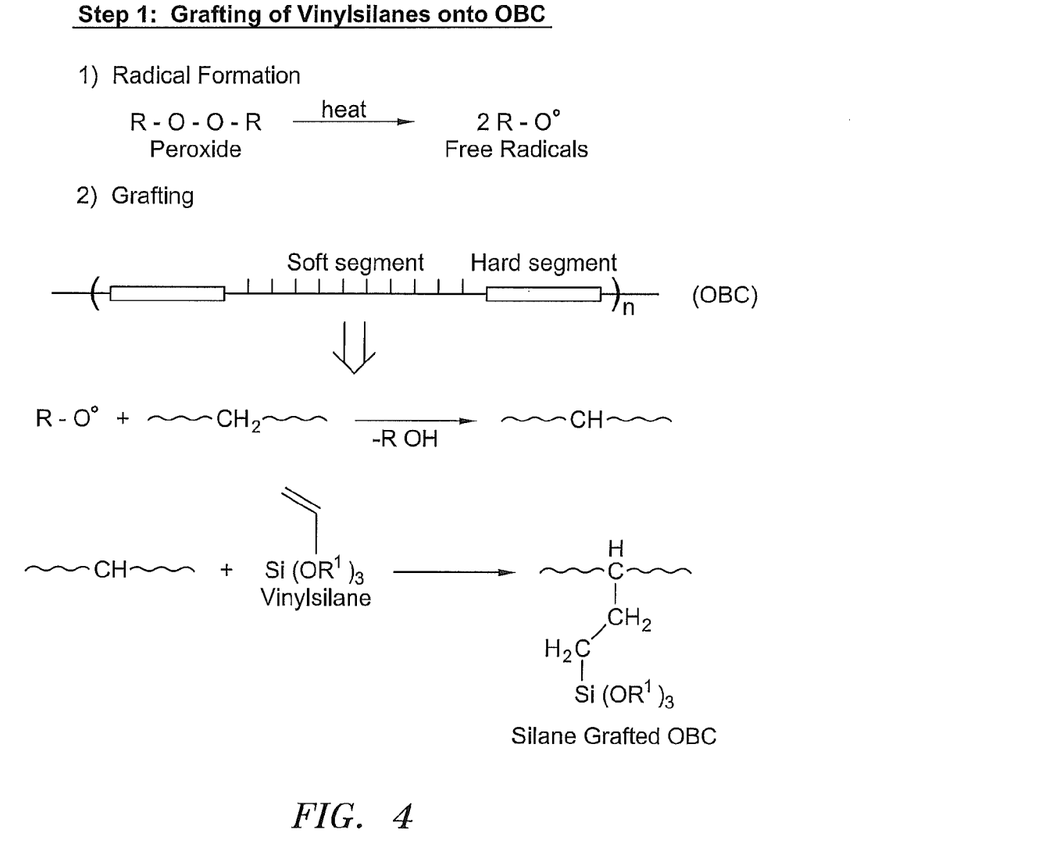
FIG. 4 is an illustration of a process for grafting of vinyl-silanes onto OBC.
Figure 5:
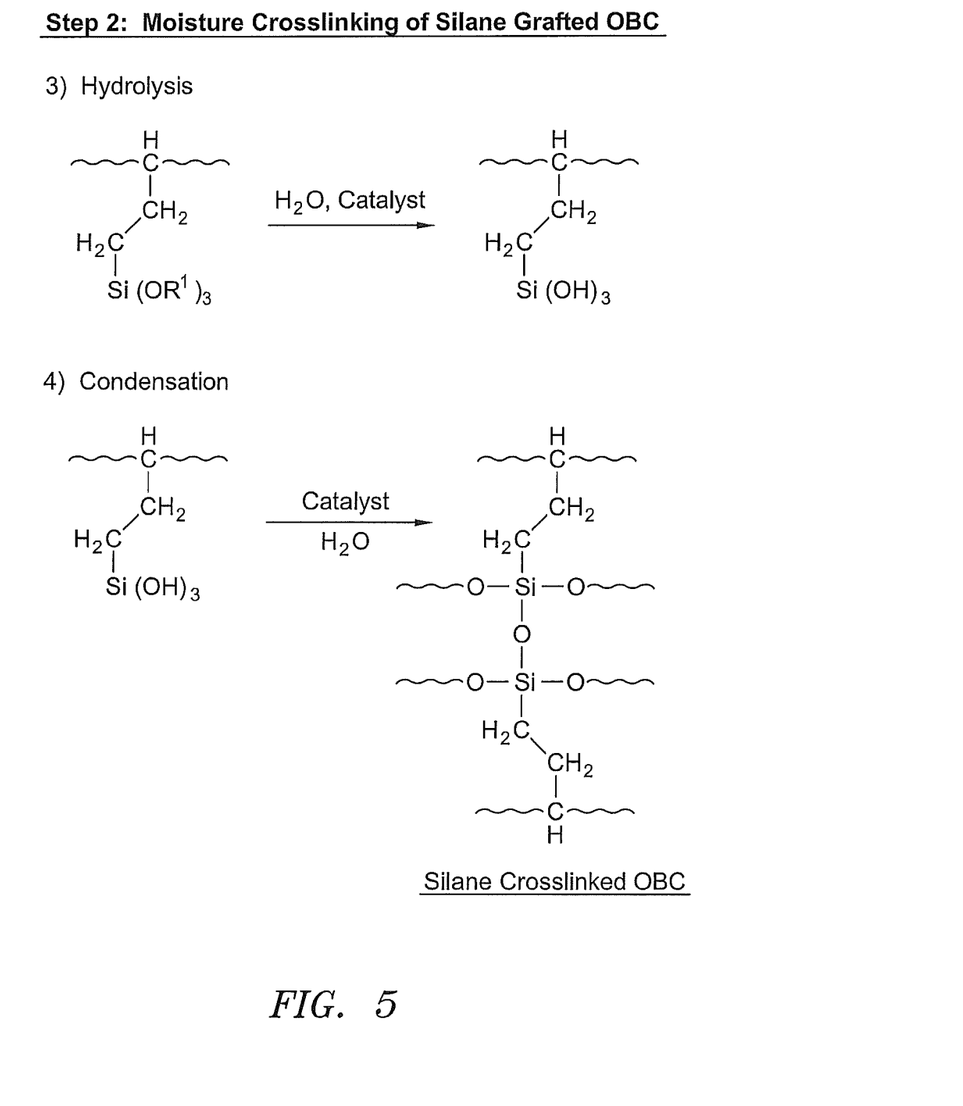
FIG. 5 is an illustration of a process for moisture crosslinking of silane grafted OBC.
Figure 6:
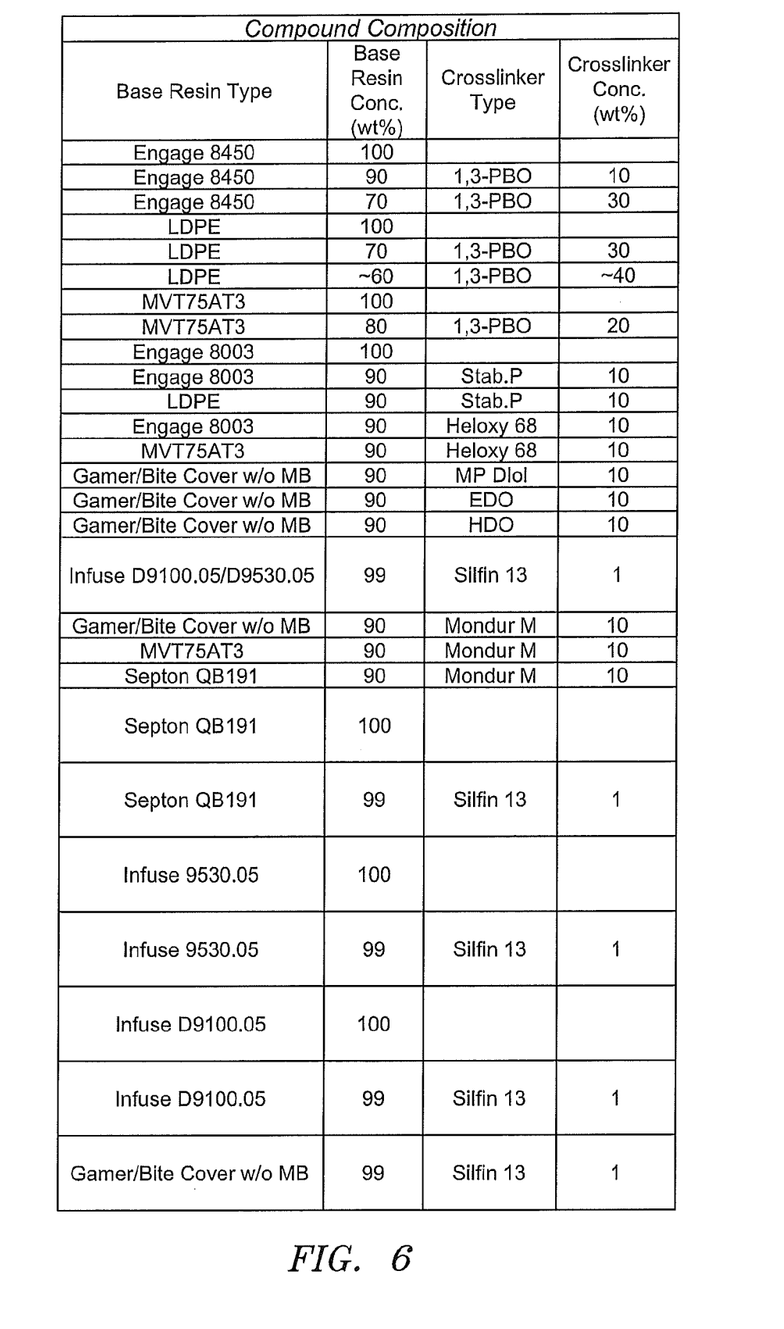
FIG. 6 is a table of compound compositions including a compound of a composition of the present invention.

A process for grafting of vinyl-silanes onto OBC is shown in FIG. 4, and a process for moisture crosslinking of silane grafted OBC is shown in FIG. 5. Step one involves radical formation of a peroxide into a free radicals using heat. Step two involves grafting a silane onto an OBC to create a silane grafted OBC. Step three involves hydrolysis of the silane grafted OBC. Step four involves condensation to create a silan crosslinked OBC.

In this process, vinylsilane (e.g. trimethoxyvinylsilane) is first grafted onto the OBC. This is done in a compounding process where the OBC and silane are added along with a free radical generator (dicumyl peroxide) to a twin screw extruder. The silane grafted OBC is then dry blended with a tin catalyst masterbatch and injection molded. After injection molding, the part is moisture cured in a hot water bath to impart the final crosslinking. Water in combination with the tin catalyst and heat hydrolyzes the alkoxysilane moieties on the silane that in turn condenses to form siloxane crosslinks. This process is similar to the PEX (crosslinked polyethylene) Monosil/Sioplas processes and has the advantage that crosslinking doesn't occur until after processing. The crosslinking improves durability of the golf ball cover.

In one aspect, the present invention provides a golf ball comprising a core, a hard inner cover layer formed over the core, and a softer outer cover layer formed over the inner cover layer. The inner cover layer has a Shore D hardness of at least 60 (or at least about 80 Shore C) as measured on the curved surface thereof and is formed of a composition including at least one material selected from the group of consisting of ionomers, polyamides, polyurethanes, polyureas, polyester elastomers, polyester amides, metallocene catalyzed polyolefins, and blends thereof. The outer cover layer has a Shore D hardness of less than 60, preferably a Shore D hardness of 55 or less, more preferably 50 or less, and most preferably 45 or less as measured on the curved surface thereof.

The mantle layer is preferably composed of a HPF material available from DuPont. Alternatively, the mantle layer is composed of a material such as disclosed in Kennedy, III et al., U.S. Pat. No. 7,361,101 for a Golf Ball And Thermoplastic Material, which is hereby incorporated by reference in its entirety.

The golf ball preferably has an aerodynamic pattern such as disclosed in Simonds et al., U.S. Pat. No. 7,419,443 for a Low Volume Cover For A Golf Ball, which is hereby incorporated by reference in its entirety. Alternatively, the golf ball has an aerodynamic pattern such as disclosed in Simonds et al., U.S. Pat. No. 7,338,392 for An Aerodynamic Surface Geometry For A Golf Ball, which is hereby incorporated by reference in its entirety. Alternatively, the golf ball has an aerodynamic pattern such as disclosed in Simonds et al., U.S. Pat. No. 7,468,007 for a Dual Dimple Surface Geometry For A Golf Ball, which is hereby incorporated by reference in its entirety.

Figure 1:
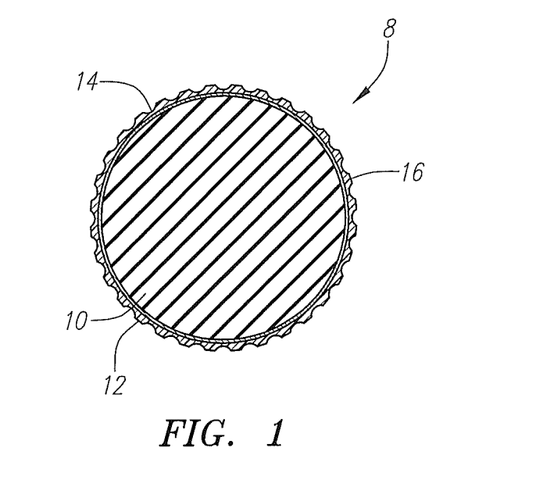
FIG. 1 is a cross-sectional view of a golf ball 8 embodying the invention illustrating a core 10 and a cover 12 consisting of an inner layer 14 and an outer layer 16.
Figure 2:
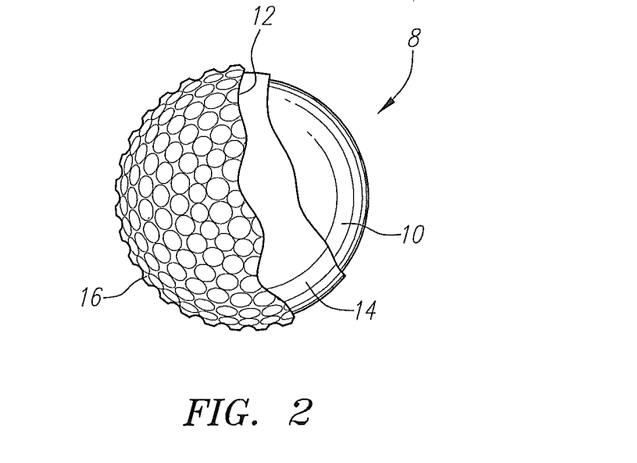
FIG. 2 is a diametrical cross-sectional view of a golf ball 8 of the invention having a core 10 and a cover 12 made of an inner layer 14 and an outer layer 16.
Figure 3:
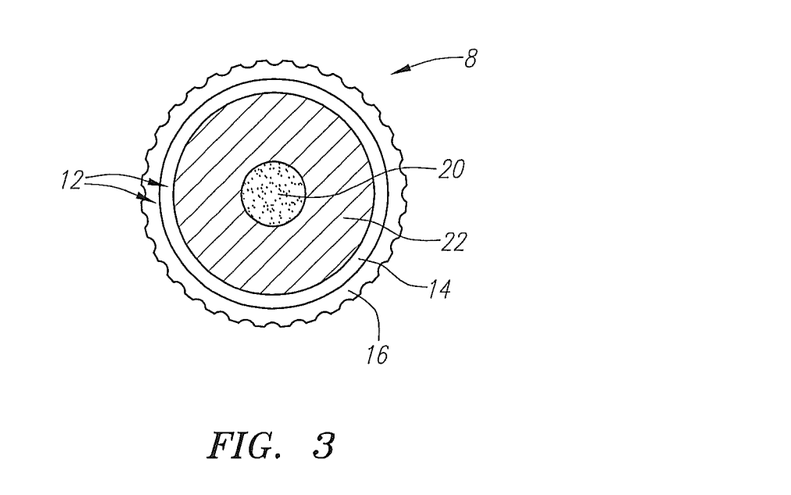
FIG. 3 is a cross-sectional view of a golf ball 8 embodying the invention illustrating a dual core having an inner core 20 and a core layer 22, and a cover 12 consisting of an inner layer 14 and an outer layer 16.

In reference to FIGS. 1-3, the present invention relates to improved multi-layer golf balls, particularly a golf ball 8 comprising a multi-layered cover 12 over a solid core 10, and method for making same. The golf balls of the invention can be of a standard or enlarged size, and the outer cover layer has improved scuff resistance. The core may have multiple layers, such as a dual core as shown in FIG. 3 having a spherical center or inner core 20 and a core layer 22 surrounding the inner core. Additional core layers may also be present. The cover layer is preferably a multi-layer cover comprising at least an inner cover layer and an outer cover, although any number of cover layers, such as 2, 3, 4, 5 or more is possible.

The core 10, or the dual core 20, 22, of the golf ball can be formed of a solid, a liquid, or any other substance that will result in an inner ball (core and inner cover layer), having the desired COR, compression and hardness. The multi-layered cover 12 comprises two layers: a first or inner layer or ply 14 and a second or outer layer or ply 16. The inner layer 14 can be ionomer, ionomer blends, non-ionomer, non-ionomer blends, or blends of ionomer and non-ionomer. The outer layer 16 is preferably softer than the inner layer and can be polyurethane, polyurea, polyurethane/polyurea blends, or a blend of a polyurethane/polyurea and ionomer or non-ionomer.

In a further embodiment, the inner layer 14 is comprised of a hard, high acid (i.e. greater than 16 weight percent acid) ionomer resin or high acid ionomer blend. Preferably, the inner layer is comprised of a blend of two or more high acid (i.e. at least 16 weight percent acid) ionomer resins neutralized to various extents by different metal cations. The inner cover layer may or may not include a metal stearate (e.g., zinc stearate) or other metal fatty acid salt. The purpose of the metal stearate or other metal fatty acid salt is to lower the cost of production without affecting the overall performance of the finished golf ball. In an additional embodiment, the inner layer 14 is comprised of a hard, low acid (i.e. 16 weight percent acid or less) ionomer blend. Preferably, the inner layer is comprised of a blend of two or more low acid (i.e. 16 weight percent acid or less) ionomer resins neutralized to various extents by different metal cations. The inner cover layer may or may not include a metal stearate (e.g., zinc stearate) or other metal fatty acid salt.

It has been found that a hard inner layer provides for a substantial increase in resilience (i.e., enhanced distance) over known multi-layer covered balls. The softer outer layer provides for desirable "feel" and high spin rate while maintaining respectable resiliency. The soft outer layer allows the cover to deform more during impact and increases the area of contact between the clubface and the cover, thereby imparting more spin on the ball. As a result, the soft cover provides the ball with a balata-like feel and playability characteristics with improved distance and durability. Consequently, the overall combination of the inner and outer cover layers results in a golf ball having enhanced resilience (improved travel distance) and durability (i.e. cut resistance, etc.) characteristics while maintaining and in many instances, improving, the playability properties of the ball.

Preferably, the inner cover layer is harder than the outer cover layer and generally has a thickness in the range of 0.010 to 0.150 inch, preferably 0.010-0.100 inch, more preferably 0.020 to 0.060 inch for a 1.68 inch ball and 0.030 to 0.100 inch for a 1.72 inches (or more) ball. The core and inner cover layer together form an inner ball having a coefficient of restitution of 0.780 or more and more preferably 0.790 or more, and a diameter in the range of 1.48 to 1.67 inches for a 1.68 inch ball and 1.50 to 1.71 inches for a 1.72 inch (or more) ball. The inner cover layer has a Shore D hardness of 60 or more (or at least about 80 Shore C). It is particularly advantageous if the golf balls of the invention have an inner layer with a Shore D hardness of 65 or more (or at least about 100 Shore C). If the inner layer is too thin, it is very difficult to accurately measure the Shore D, and sometimes the Shore C, of the inner layer as the layer may puncture. Additionally, if the core is harder, this will sometimes influence the reading. If the Shore C or Shore D is measured on a plaque of material, different values will result. The above-described characteristics of the inner cover layer provide an inner ball having a PGA compression of 100 or less. It is found that when the inner ball has a PGA compression of 90 or less, excellent playability results.

The inner layer compositions of the embodiments described herein may include the high acid ionomers such as those developed by E.I. DuPont de Nemours & Company under the trademark Surlyn® and by Exxon Corporation under the trademarks Escor® or Iotek®, or blends thereof. Examples of the high acid methacrylic acid based ionomers found suitable for use in accordance with this invention include Surlyn® 8220 and 8240 (both formerly known as forms of Surlyn® AD-8422), Surlyn® 9220 (zinc cation), Surlyn® SEP-503-1 (zinc cation), and Surlyn® SEP-503-2 (magnesium cation). According to DuPont, all of these ionomers contain from about 18.5 to about 21.5% by weight methacrylic acid. Examples of the high acid acrylic acid based ionomers suitable for use in the present invention also include the Escor® or Iotek® high acid ethylene acrylic acid ionomers produced by Exxon such as Ex 1001, 1002, 959, 960, 989, 990, 1003, 1004, 993, 994. In this regard, Escor® or Iotek® 959 is a sodium ion neutralized ethylene-acrylic neutralized ethylene-acrylic acid copolymer. According to Exxon, Ioteks® 959 and 960 contain from about 19.0 to about 21.0% by weight acrylic acid with approximately 30 to about 70 percent of the acid groups neutralized with sodium and zinc ions, respectively.

The outer layer is 0.005 to about 0.150 inch in thickness, preferably 0.010 to 0.075 inch in thickness, more desirably 0.015 to 0.050 inch in thickness, but thick enough to achieve desired playability characteristics while minimizing expense. Thickness is defined as the average thickness of the non-dimpled areas of the outer cover layer. The outer cover layer 16 has a Shore D hardness of less than 60 (or less than about 90 Shore C), and more preferably 55 or less (or about 85 to 88 Shore C or less). If the outer layer is too thin, it is very difficult to accurately measure the Shore D, and sometimes the Shore C, of the outer layer as the layer may puncture. Additionally, if the inner layer and/or core is harder than the outer layer, this will sometimes influence the reading. If the Shore C or Shore D is measured on a plaque of material, different values may result.

The outer cover layer of the invention is formed over a core to result in a golf ball having a coefficient of restitution of at least 0.770, more preferably at least 0.780, and most preferably at least 0.790. The coefficient of restitution of the ball will depend upon the properties of both the core and the cover. The PGA compression of the golf ball is 100 or less, and preferably is 90 or less.

The cores of the inventive golf balls typically have a coefficient of restitution of about 0.750 or more, more preferably 0.770 or more and a PGA compression of about 90 or less, and more preferably 70 or less. Furthermore, in some applications it may be desirable to provide a core with a coefficient of restitution of about 0.780 to 0.790 or more. The core used in the golf ball of the invention preferably is a solid. The term "solid cores" as used herein refers not only to one piece cores but also to those cores having a separate solid layer beneath the covers and over the central core. The cores have a weight of 25-40 grams and preferably 30-40 grams. When the golf ball of the invention has a solid core, this core can be compression molded from a slug of uncured or lightly cured elastomer composition comprising a high cis content polybutadiene and a metal salt of an α, β, ethylenically unsaturated carboxylic acid such as zinc mono- or diacrylate or methacrylate. To achieve higher coefficients of restitution and/or to increase hardness in the core, the manufacturer may include a small amount of a metal oxide such as zinc oxide. In addition, larger amounts of metal oxide than are needed to achieve the desired coefficient may be included in order to increase the core weight so that the finished ball more closely approaches the U.S.G.A. upper weight limit of 1.620 ounces. Non-limiting examples of other materials which may be used in the core composition including compatible rubbers or ionomers, and low molecular weight fatty acids such as stearic acid. Free radical initiator catalysts such as peroxides are admixed with the core composition so that on the application of heat and pressure, a curing or cross-linking reaction takes place.

A thread wound core may comprise a liquid, solid, gel or multi-piece center. The thread wound core is typically obtained by winding a thread of natural or synthetic rubber, or thermoplastic or thermosetting elastomer such as polyurethane, polyester, polyamide, etc. on a solid, liquid, gel or gas filled center to form a thread rubber layer that is then covered with one or more mantle or cover layers. Additionally, prior to applying the cover layers, the thread wound core may be further treated or coated with an adhesive layer, protective layer, or any substance that may improve the integrity of the wound core during application of the cover layers and ultimately in usage as a golf ball.

In preparing golf balls in accordance with the present invention, an inner cover layer, preferably a hard inner cover layer, is molded (for example, by injection molding or by compression molding) about a core (preferably a solid core). A comparatively softer outer layer is molded (for example, by injection molding or by reaction injection molding) over the inner layer.

The solid core for the multi-layer ball is about 1.2 to 1.6 inches in diameter, although it may be possible to use cores in the range of about 1.0 to 2.0 inches. Conventional solid cores are typically compression or injection molded from a slug or ribbon of uncured or lightly cured elastomer composition comprising a high cis content polybutadiene and a metal salt of an $\alpha$, $\beta$, ethylenically unsaturated carboxylic acid such as zinc mono or diacrylate or methacrylate. To achieve higher coefficients of restitution in the core, the manufacturer may include fillers such as small amounts of a metal oxide such as zinc oxide. In addition, larger amounts of metal oxide than those that are needed to achieve the desired coefficient are often included in conventional cores in order to increase the core weight so that the finished ball more closely approaches the U.S.G.A. upper weight limit of 1.620 ounces. Other materials may be used in the core composition including compatible rubbers or ionomers, and low molecular weight fatty acids such as stearic acid. Free radical initiators such as peroxides are admixed with the core composition so that on the application of heat and pressure, a complex curing cross-linking reaction takes place.

In some embodiments, the inner cover layer(s) that is molded over the core is about 0.010 inch to about 0.150 inch in thickness, more preferably about 0.020 to about 0.10 inch thick. The inner ball that includes the core and inner cover layer(s) preferably has a diameter in the range of 1.25 to 1.64 inches. The outer cover layer is 0.005 inch to 0.075 inch in thickness, preferably 0.010 to 0.050 inch thick, more preferably 0.010 to 0.040 inch thick, and most preferably 0.010 to 0.030 inch thick. Together, the core, the inner cover layer(s) and the outer cover layer combine to form a ball having a diameter of 1.680 inches or more, the minimum diameter permitted by the rules of the United States Golf Association and weighing no more than 1.62 ounces.

In an alternative embodiment of the invention, the golf ball has a dimple pattern that provides dimple coverage of 65% or more, preferably 75% or more, and more preferably 85% or more. In a preferred embodiment of the invention, there are greater than 300 dimples, preferably from about 300 to about 500 dimples.

In a preferred embodiment, the golf ball typically is coated with a durable, abrasion-resistant, relatively non-yellowing finish coat or coats if necessary. The finish coat or coats may have some optical brightener added to improve the brightness of the finished golf ball. In a preferred embodiment, from 0.001 to about 10% optical brightener may be added to one or more of the finish coatings. Preferred finish coatings are solvent based urethane coatings known in the art.

The golf balls of the present invention can be produced by molding processes, which include but are not limited to those that are currently well known in the golf ball art. For example, the golf balls can be produced by injection molding or compression molding the novel cover compositions around a wound or solid molded core to produce an inner ball, which typically has a diameter of about 1.50 to 1.67 inches. The outer layer is subsequently molded over the inner layer to produce a golf ball having a diameter of about 1.680 inches or more. Although either solid cores or wound cores can be used in the present invention, as a result of their lower cost and superior performance, solid molded cores are preferred over wound cores. The standards for both the minimum diameter and maximum weight of the balls are established by the United States Golf Association (U.S.G.A.).

In compression molding, the inner cover composition is formed via injection molding at about 380° F. to about 450° F. into smooth surfaced hemispherical shells which are then positioned around the core in a mold having the desired inner cover thickness and subjected to compression molding at 200° F. to 300° F. for about 2 to 10 minutes, followed by cooling at 50° F. to 70° F. for about 2 to 7 minutes to fuse the shells together to form a unitary intermediate ball. In addition, the intermediate balls may be produced by injection molding wherein the inner cover layer is injected directly around the core placed at the center of an intermediate ball mold for a period of time in a mold temperature of from 50° F. to about 100° F. Subsequently, the outer cover layer is molded about the core and the inner layer by similar molding techniques to form a dimpled golf ball of a diameter of 1.680 inches or more. To improve the adhesion between the inner cover layer and the outer cover layer, an adhesion promoter may be used. Some adhesion promoters, such as abrasion of the surface, corona treatment, and the like, are known in the art. A preferred adhesion promoter is a chemical adhesion promoter, such as a silane or other silicon compound, preferably N-(2-aminoethyl)3-aminopropyltrimethoxysilane. The intermediate golf ball (core and inner cover layer) may be dipped or sprayed with the chemical, and then the outer cover layer is formed over the treated inner cover layer.

After molding, the golf balls produced may undergo various further processing steps such as buffing, painting and marking as disclosed in U.S. Pat. No. 4,911,451.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. A method for forming a golf ball cover, the method comprising:
    forming free radicals from a peroxide material;
    grafting a vinyl-silane onto an ethylene-octene block copolymer material to form a silane grafted ethylene-octene block copolymer material, wherein grafting comprises compounding the vinyl-silane, the ethylene-octene block copolymer material and free radicals in a twin screw extruder;

dry-blending the silane grafted ethylene-octene block copolymer material with a tin catalyst masterbatch to create a cover composition material;

injection molding the cover composition material onto a golf ball insert assembly to create a covered golf ball; and moisture curing the covered golf ball in a hot water bath to impart crosslinking through water in combination with the tin catalyst and heat hydrolyzes a plurality of alkoxysilane moieties on the silane grafted ethylene-octene block copolymer that in turn condenses to form siloxane crosslinks in the cover composition material.

2. The method according to claim 1 wherein the golf ball insert assembly comprises a core and a mantle layer.

3. The method according to claim 1 wherein the golf ball insert assembly comprises a dual core and a mantle layer.

4. The method according to claim 1 wherein the golf ball insert assembly comprises a core.

5. The method according to claim 1 wherein the golf ball insert assembly comprises a dual core and a mantle layer composed of a HPF material.

6. The method according to claim 1 wherein the golf ball insert assembly comprises a hollow core and a mantle layer.

7. The method according to claim 1 wherein the golf ball insert assembly comprises a liquid-filled core and a mantle layer.

8. The method according to claim 1 wherein the golf ball insert assembly comprises a thread-wound core and a mantle layer.

9. The method according to claim 1 wherein the vinylsilane is a trimethoxyvinylsilane.

* * * * *